(12) United States Patent  (10) Patent No.: US 8,877,661 B2
Kümpers et al.  (45) Date of Patent: Nov. 4, 2014

(54) ENERGY-ABSORBING TEXTILE STRUCTURE, IN PARTICULAR FOR USE IN VEHICLE CONSTRUCTION AND METHOD FOR PRODUCING SAID STRUCTURE

(75) Inventors: Franz-Jürgen Kümpers, Rheine (DE); Olaf Rüger, Böblingen (DE); Hanno Pfitzer, Furth (DE)

(73) Assignee: SGL Kümpers GmbH & Co. KG, Rheine (DE)

( * ) Notice: Subject to any disclaimer, the term of this patent is extended or adjusted under 35 U.S.C. 154(b) by 1245 days.

(21) Appl. No.: 12/223,475

(22) PCT Filed: Feb. 1, 2007

(86) PCT No.: PCT/EP2007/000851
§ 371 (c)(1),
(2), (4) Date: Jul. 31, 2008

(87) PCT Pub. No.: WO2007/090556
PCT Pub. Date: Aug. 16, 2007

(65) Prior Publication Data
US 2009/0035529 A1   Feb. 5, 2009

(30) Foreign Application Priority Data
Feb. 3, 2006 (DE) .......................... 10 2006 004 885

(51) Int. Cl.
*D03D 13/00* (2006.01)
*D04C 1/06* (2006.01)
*F16F 7/00* (2006.01)

(52) U.S. Cl.
CPC .. *D04C 1/06* (2013.01); *F16F 7/006* (2013.01)
USPC .................... 442/204; 428/85; 87/8

(58) Field of Classification Search
CPC ............. D04C 1/06; D04C 1/00; F16F 6/006; B06Y 2305/01
USPC .................... 428/85; 442/204; 87/8
See application file for complete search history.

(56) References Cited

U.S. PATENT DOCUMENTS 1,780,515 A * 11/1930 Berlin ................................. 87/8
3,922,455 A * 11/1975 Brumlik .......................... 428/85
4,690,850 A    9/1987 Fezio ............................ 428/105
5,979,288 A   11/1999 Gallagher et al. ................. 87/36

FOREIGN PATENT DOCUMENTS

EP    0 249 372 A2     6/1987
JP    2002086601 A  *  3/2002
WO   WO 95/30532      11/1995

* cited by examiner

*Primary Examiner* — Elizabeth Cole
(74) *Attorney, Agent, or Firm* — Nelson Mullins Riley & Scarborough LLP

(57) ABSTRACT

Energy-absorbing textile structure, in particular for use in vehicle construction, which has high-tensile yarns for absorbing force, is formed by a braided fabric (2) with standing ends (3) in the force input direction and in that the textile structure has at least one region (4) with local modification of the fiber structure (2, 3).

8 Claims, 3 Drawing Sheets

ENERGY-ABSORBING TEXTILE STRUCTURE, IN PARTICULAR FOR USE IN VEHICLE CONSTRUCTION AND METHOD FOR PRODUCING SAID STRUCTURE

CROSS REFERENCE TO RELATED APPLICATIONS

This application is a 371 of PCT/EP2007/000851 filed Jan. 1, 2007. This application claims the benefit of German patent application no. 10 2006 004 885.7, filed Feb. 3, 2006, herein incorporated by reference.

BACKGROUND OF THE INVENTION

The invention relates to an energy-absorbing textile structure, in particular for use in vehicle construction, which has high-tensile yarns for absorbing force, and a method for producing the textile structure.

Energy-absorbing structures are currently substantially formed by metallic structures, which absorb energy by plastic deformation. However, these metallic structures have the drawback of a high weight in relation to the energy absorption. For this reason, there has already been a change to replacing the metallic structures by textile structures, which contain high-tensile fiber materials. These have high weight-specific energy absorption.

The energy-absorbing structures made of high-tensile textile materials are, however, not plastically deformed like the metallic materials, but if appropriate provision is not made, may abruptly fail at a random weak point without absorbing energy to a significant extent. For this reason, corresponding inputs of force are provided in these structures, by means of which a trigger mechanism is initiated, which ensures that the failure starts in a defined manner and progresses continuously.

These force input regions were implemented according to the prior art by changing the geometry of the base body, for example by weakening the wall thickness. This measure is relatively expensive, however, as this has to be carried out in a downstream processing step. A further disadvantage is that the geometric triggers no longer function reliably if other structural elements are attached in the force input region (for example the connection of longitudinal and transverse beams). In these cases, a remedy can only be provided by additional structural elements, which entail weight and additional costs.

SUMMARY OF THE INVENTION

It is therefore the object of the invention to develop an energy-absorbing textile structure, which contains reliable force input regions which can be produced by simple means and to propose a method for producing the structure according to the invention.

This object is achieved in the present invention by providing an energy-absorbing textile structure, in particular for use in vehicle construction, having high-tensile yarns for absorbing force, wherein the textile structure is formed by a braided fabric with standing ends in the force input direction and wherein the textile structure has at least one region with local modification of the fiber structure. The present invention also provides a method for producing such an energy-absorbing structure wherein the base body is displaced relative to braiding tools when braiding onto a base body and in that to produce the local modification in the fiber structure, the movement of the base body is modified.

Further developments according to the invention are described more fully hereinafter.

The change of the fiber structure according to the invention cannot only be implemented with simple means and virtually without additional outlay, but also ensures a targeted, adjustable and reliable local weakening of the structure. This produces a defined force input region, which ensures a defined starting and progression of the failure of the structure.

Apart from a controllable and reduced starting load level, in the process of the further deformation, high energy absorption is maintained. In this manner, the deceleration progress, for example of a motor vehicle when colliding with a resistance, is optimised. It has also been shown that the connection of other structural elements in the force input region does not impair, or only insignificantly, the effect of the trigger. A structure according to the invention is therefore also suitable for complex force input geometries.

The textile structure, according to the invention, is formed by a braided fabric with standing ends in the force input direction. A change of direction of the standing ends, which ensure the essential force absorption, leads to a very effective weakening of the force input and therefore a clear definition of the force input region.

The change in direction is preferably temporary as the remaining regions outside the force input zone have to provide a high measure of energy absorption.

It has been shown that a triple change in direction of the standing ends produces a very clear reduction in the load peak, so no excessively high starting deceleration occurs.

A change in the braiding angle also leads to a local change in the structure. However, a change in the braiding angle alone is only noticeably effective if the deviation in the angle is relatively significant. It is therefore sensible to combine the change in the braiding angle with a change in the direction of the standing ends. In principle, the extent of the effect on the weakening of the structure also changes with the extent of the respective change. Therefore a virtually tailor-made construction for the respective application can be produced by using the invention. The selection of the yarn materials in the standing end and in the braiding yarn furthermore contributes thereto. Generally, a particularly high-value material can be dispensed with in the braiding yarn, so glass fibers are used, for example, while more expensive carbon fiber yarns are preferably used for the standing ends.

The method according to the invention exhibits a very economical and flexible production possibility for the structure according to the invention. Fixed braiding tools and yarn guides for supplying the standing end produce the textile structure according to the invention by feeding the base body and a modification of this movement in the region of the local modification. An additional rotation of the base body is carried out to change the direction of the standing ends, while to change the braiding angle, the feed speed of the base body is modified to the desired extent.

BRIEF DESCRIPTION OF THE DRAWINGS

The invention will be described in more detail below with the aid of embodiments. In the associated drawings.

DETAILED DESCRIPTION OF THE PREFERRED EMBODIMENTS

Figure 1:
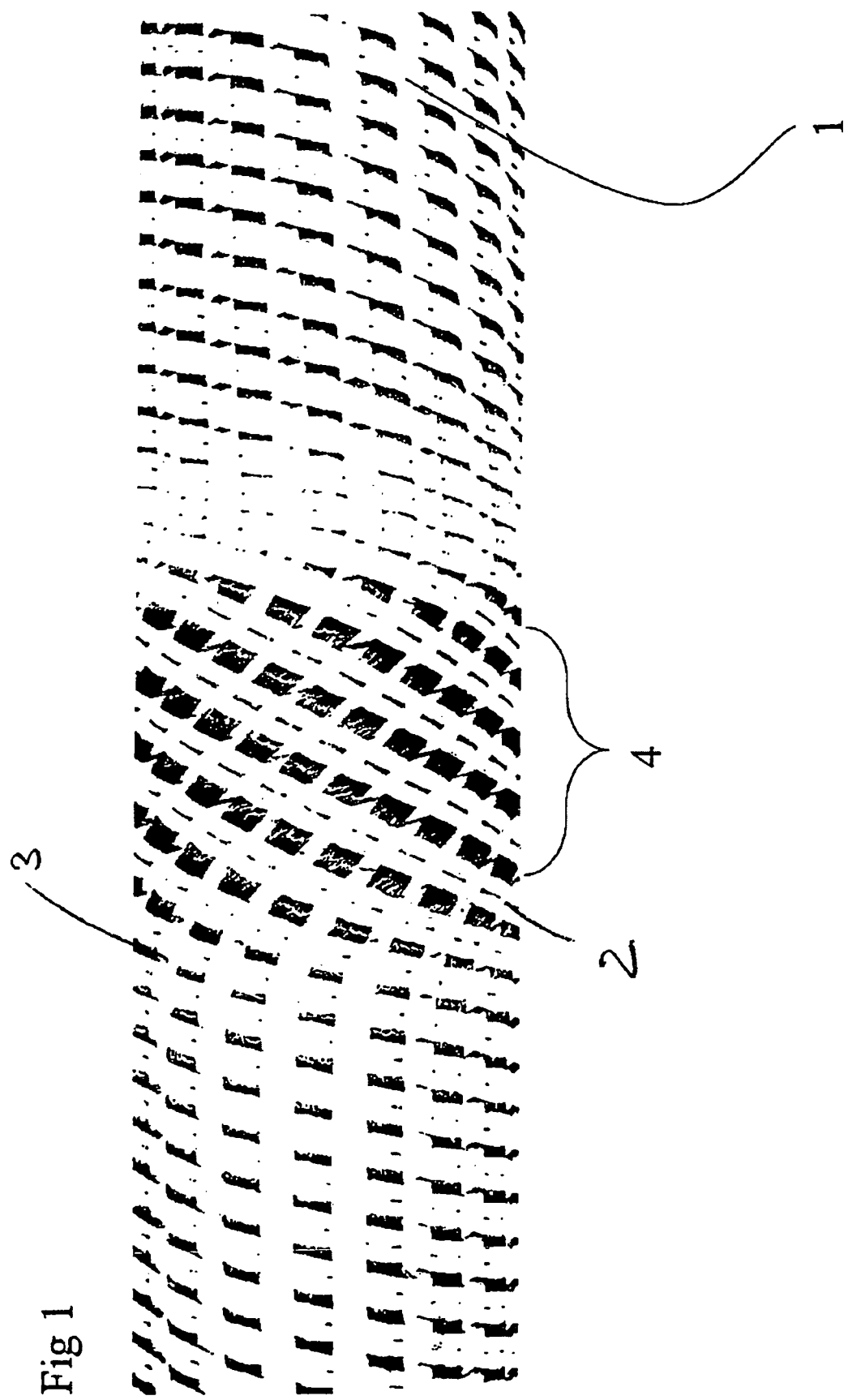
FIG. 1 shows a textile structure according to the invention with a region, in which the direction of the standing ends changes twice.

In the variant according to the invention, which is shown in FIG. 1, the standing ends 3 made of carbon fibers extending along a base body 1 are deflected twice with respect to their direction in a region 4 and thus form a weak point in the structure, which is used for targeted force input, in other words, by means of which, on the one hand, the load peak which initiates the deformation process is limited and moreover a targeted triggering is favoured, which is used for continuously high energy absorption during he deformation process. The production of this region with a deviating depositing angle of the standing ends 3 takes place by means of a rotary movement of a base body 1 taking place in addition to the feed movement of the base body 1 over a predeterminable angle.

Figure 2:
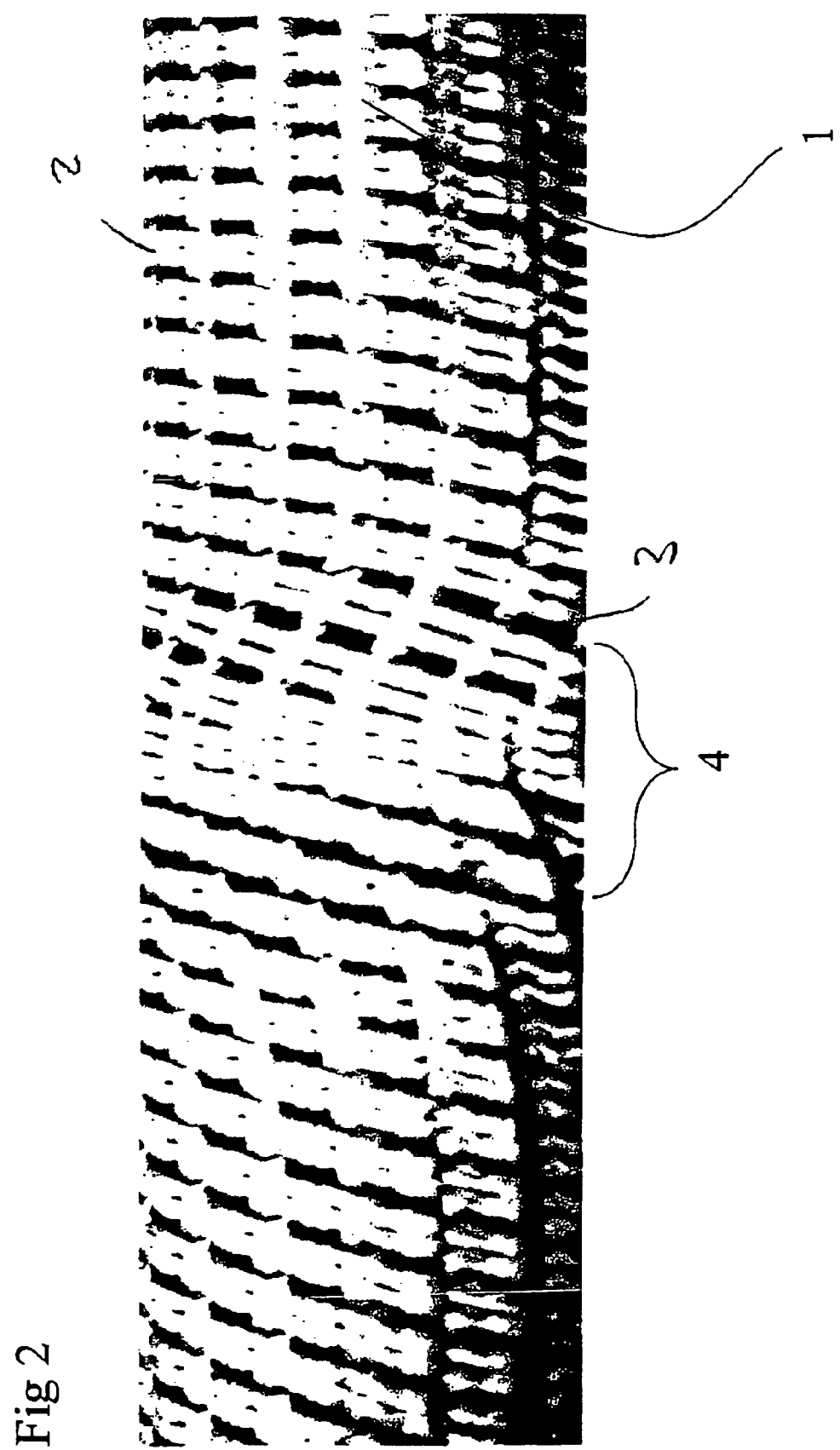
FIG. 2 shows a textile structure according to the invention with a region, in which the direction of the standing ends changes three times

In the example of FIG. 2, the rotary process of the base body 1 takes place back and forth over a predeterminable angle. As a result, the standing ends run at the same height on both sides of the region 4. The effect of the region 4 as a force input region is particular intensive here.

Figure 3:
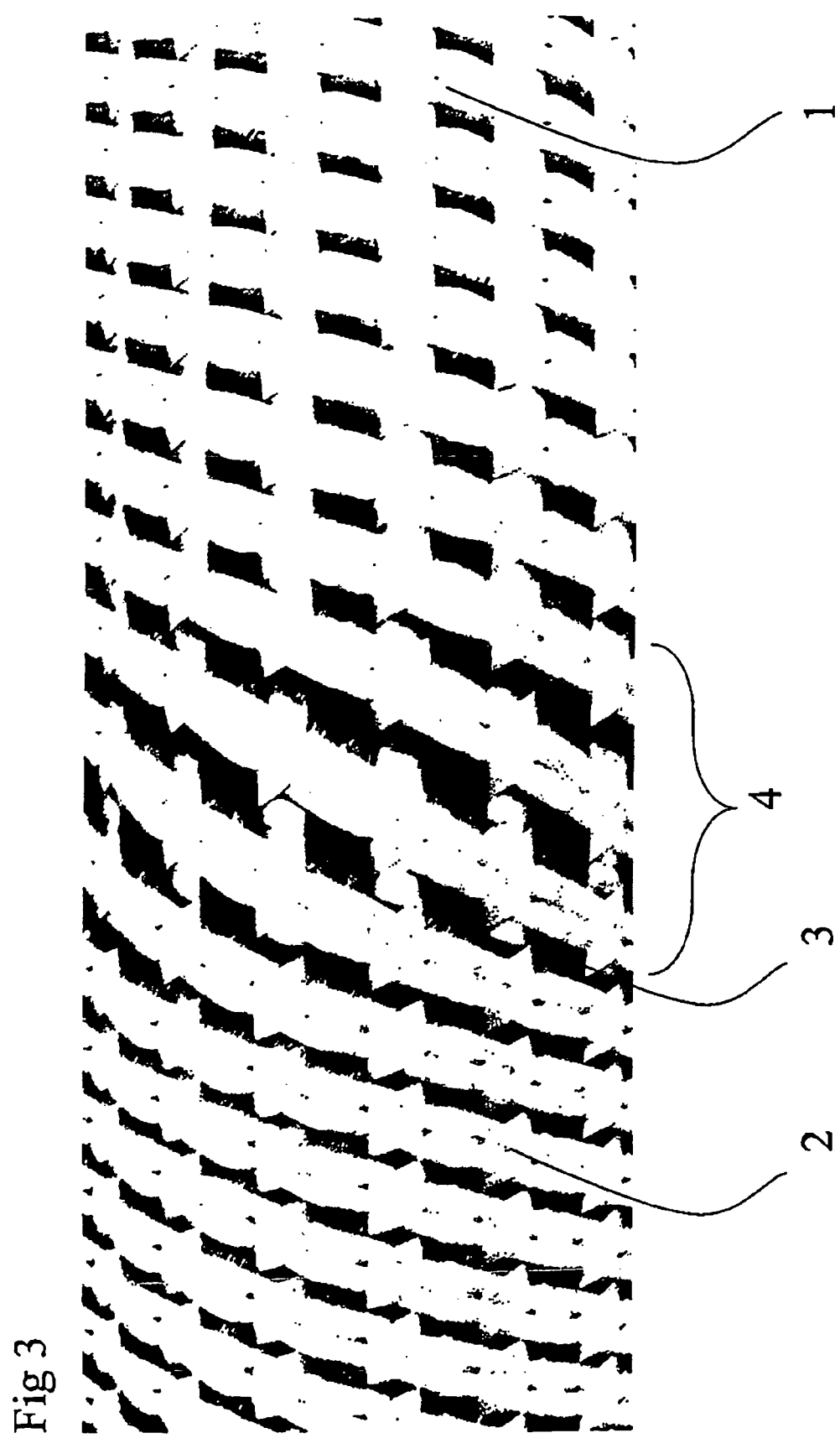
FIG. 3 shows a textile structure according to the invention with a region in which the direction of the braiding yarns changes.

According to FIG. 3, the braiding angle of the braiding yarns 2 is modified in the region 4. A force input region, which is brought about because of the change in the structure is also produced thereby. The change in the braiding angle alone does not lead to a comparable forming of the weakening, however, so, generally, a combination of a change in the braiding angle and the change in direction of the standing ends is preferred. The braiding angle change is brought about by a change in the feed speed of the base body.

What is claimed is:

1. Energy-absorbing textile structure comprised of an elongated braided fabric structure (2, 3) having a longitudinal extent and comprising braiding yarns (2) and standing yarns (3) extending in angular relation to one another, the standing yarns (3) being of a selected tensile strength, the braided fabric structure (2, 3) having:
    a longitudinally extending main body region (1) occupying the predominant portion of the longitudinal extent of the braided fabric structure (2, 3), wherein the standing yarns (3) are selectively oriented substantially parallel to the longitudinal extent of the braided fabric structure (2, 3) and the braiding yarns (2) are selectively oriented angularly to the standing yarns (3) and to the longitudinal extent of the braided fabric structure (2, 3), and
    at least one localized region (4) occupying only one or more relatively smaller portions of the longitudinal extent of the braided fabric structure (2, 3) at one or more selected locations longitudinally adjacent the main body region (1) along the longitudinal extent of the braided fabric structure (2, 3), wherein both the standing yarns (3) and the braiding yarns (2) are selectively oriented angularly to each other and to the longitudinal extent of the braided fabric structure (2, 3) only within the one or more localized regions,
    the longitudinally parallel orientation of the standing yarns (3) within the main body region (1) imparting selective strengthening in the longitudinal extent of the braided fabric structure (2, 3) within the main body region (1) relative to the at least one localized region (4) to selectively render the main body region (1) as a relatively stronger region of the braided fabric structure (2, 3), and
    the angular orientation of both the standing yarns (3) and the braided yarns (2) in relation to the longitudinal extent of the braided fabric structure (2, 3) within the one or more localized regions (4) imparting selective weakening in the longitudinal extent of the braided fabric structure (2, 3) only within the one or more localized regions (4) relative to the main body region (1) to selectively render only the one or more localized regions (4) as one or more relatively weaker regions of the braided fabric structure (2, 3).

2. Energy-absorbing textile structure according to claim 1, characterised in that the change of direction is a triple change of direction in opposing directions.

3. Energy-absorbing textile structure according to claim 1, characterised in that the braiding angle of the braiding yarns (2) is changed in the localized weaker region (4).

4. Energy-absorbing textile structure according to claim 1, characterised in that the standing yarns (3) are formed from carbon fibers.

5. Method for producing an energy-absorbing textile structure, comprising the steps of braiding together braiding yarns (2) and standing yarns (3) of a selected tensile strength to form an elongated braided fabric structure (2, 3) having a longitudinal extent, wherein the braiding of the yarns (2, 3) comprises:
    forming a longitudinally extending main body region (1) occupying the predominant portion of the longitudinal extent of the braided fabric structure (2, 3), wherein the standing yarns (3) are selectively oriented substantially parallel to the longitudinal extent of the braided fabric structure (2, 3) and the braiding yarns (2) are selectively oriented angularly to the standing yarns (3) and to the longitudinal extent of the braided fabric structure (2, 3), and
    forming at least one localized region (4) occupying only one or more relatively smaller portions of the longitudinal extent of the braided fabric structure (2, 3) at one or more selected locations longitudinally adjacent the main body region (1) along the longitudinal extent of the braided fabric structure (2, 3), wherein both the standing yarns (3) and the braiding yarns (2) are selectively oriented angularly to each other and to the longitudinal extent of the braided fabric structure (2, 3) only within the one or more localized regions,
    the longitudinally parallel orientation of the standing yarns (3) within the main body region (1) imparting selective strengthening in the longitudinal extent of the braided fabric structure (2, 3) within the main body region (1) relative to the at least one localized region (4) to selectively render the main body region (1) as a relatively stronger region of the braided fabric structure (2, 3), and
    the angular orientation of both the standing yarns (3) and the braided yarns (2) in relation to the longitudinal extent of the braided fabric structure (2, 3) within the one or more localized regions (4) imparting selective weakening in the longitudinal extent of the braided fabric structure (2, 3) only within the one or more localized regions (4) relative to the main body region (1) to selectively render only the one or more localized regions (4) as one or more relatively weaker regions of the braided fabric structure (2, 3).

6. Method according to claim 5, characterised in that the braiding of the yarns (2, 3) comprises applying the yarns (2, 3) via braiding tools onto a base body (1) while displacing the base body (1) relative to the braiding tools for normally orienting the braiding yarns (2) angularly within the braided fabric structure (2, 3) relative to the longitudinal extent thereof and for normally orienting the standing yarns (3) generally parallel to the longitudinal extent of the braided fabric structure, and selectively causing the base body (1) to rotate in addition to the displacing movement of the base body (1) to produce said localized change in direction of the standing yarns (3) out of parallel with the longitudinal extent of the braided fabric structure within the at least one localized weaker region (4) thereof.

7. Method according to claim 6, characterised in that the rotary movement of the base body (1) is adapted to the desired change of direction of the standing yarns (3).

8. Method according to claim 6, characterized further by changing the braiding angle of the braiding yarns (2) during the formation of the at least one localized weaker region (4) by altering the displacing movement of the base body (1) during the production of the local weakening is adapted to the extent of the desired change in braiding angle.

* * * * *